(12) United States Patent
Stafford

(10) Patent No.: US 6,826,908 B1
(45) Date of Patent: Dec. 7, 2004

(54) PRESSURE REGULATOR VALVE ASSEMBLY

(75) Inventor: Maura Jane Stafford, Warner Robins, GA (US)

(73) Assignee: Sonnax Industries, Inc., Bellows Falls, VT (US)

( * ) Notice: Subject to any disclaimer, the term of this patent is extended or adjusted under 35 U.S.C. 154(b) by 0 days.

(21) Appl. No.: 10/368,987

(22) Filed: Feb. 18, 2003

Related U.S. Application Data

(60) Provisional application No. 60/361,402, filed on Mar. 5, 2002.

(51) Int. Cl.[7] .............................................. F16D 33/06
(52) U.S. Cl. ........................................ 60/357; 475/127
(58) Field of Search ........................... 60/357; 475/127; 477/127

(56) References Cited

U.S. PATENT DOCUMENTS

| | | | | |
|---|---|---|---|---|
| 4,027,474 A | * | 6/1977 | Demase | 60/39.281 |
| 4,271,939 A | | 6/1981 | Iwanaga et al. | 192/3.3 |
| 4,618,036 A | | 10/1986 | Ideta | 192/3.3 |
| 4,724,727 A | * | 2/1988 | Shibayama et al. | 475/128 |
| 6,485,388 B2 | * | 11/2002 | Kim et al. | 475/127 |
| 6,543,472 B2 | * | 4/2003 | Stafford | 137/454.2 |
| 6,712,726 B1 | * | 3/2004 | Jackson et al. | 475/127 |

* cited by examiner

Primary Examiner—Thomas E. Lazo
(74) Attorney, Agent, or Firm—Clifford F. Rey

(57) ABSTRACT

A pressure regulator valve assembly for an automatic transmission that provides continuous hydraulic fluid flow into the torque converter charge circuit in all operating modes to prevent torque converter overheating is disclosed. The present pressure regulator valve assembly includes a valve piston subassembly having an encapsulated internal check valve in fluid communication with the line pressure circuit, which diverts hydraulic fluid to the torque converter charge circuit responsive to a lower fluid pressure (i.e. 2–5 psi range) than is normally required to fill the torque converter. When the vehicle engine is shut off, the internal check valve also prevents hydraulic fluid from draining back through the pressure regulator valve to maintain an adequate fluid level in the torque converter. In addition, an internal balance boost circuit has been added to the valve piston subassembly to assist the balance circuit in counteracting electronic pressure control (EPC) solenoid pressure.

15 Claims, 5 Drawing Sheets

PRESSURE REGULATOR VALVE ASSEMBLY

CROSS-REFERENCE TO RELATED APPLICATION

This application claims the benefit under 35 U.S.C. 119(e) of U.S. Provisional Patent Application No. 60/361,402 filed Mar. 5, 2002, entitled Pressure Regulator Valve.

BACKGROUND OF THE INVENTION

The present invention relates to automatic transmission systems and, more particularly, to an improved Pressure Regulator Valve Assembly for Ford E40D transmissions.

Automatic transmission systems of the prior art have a hydraulic circuit subsystem which includes at least a hydraulic pump, a valve body having fluid conducting passages or circuits, input and exhaust ports formed within the fluid circuits, and a plurality of so-called spool valves comprised of generally cylindrical pistons having control diameters or lands formed thereon, which alternately open and close the ports to the fluid circuits to regulate the flow and pressure of automatic transmission fluid (hereinafter "ATF"). It will be understood that in describing hydraulic fluid circuits, ATF usually changes names when it passes through an orifice or control valve in a specific circuit.

Pumps in automatic transmission systems are generally positive displacement pumps driven by the engine of the vehicle wherein the transmission is installed. A positive displacement pump is one, which has the same output per revolution regardless of pump speed or pressure already developed in the system. Thus, it is necessary to regulate ATF pressure so it does not get too high or too low and damage other components.

A basic pressure regulator employs a piston and a spring that compresses at a specific pressure to allow some ATF to flow back to the pump reservoir or sump bypassing the hydraulic circuits and reducing pressure. By using a pressure regulator with a spring calibrated to a pressure lower than the pump's output, constant pressure can be maintained in the system during operation.

Vehicles with Ford E40D transmissions often have service complaints of the torque converter overheating and high line pressure, which is attributable, in part, to the design of the original equipment manufacture (hereinafter "OEM") Main Regulator Valve. When in the Park gear range and at low speeds, the Ford E40D Main Regulator Valve is designed to feed adequate ATF to the torque converter and transmission cooler circuits. However, at higher speeds and/or under high EPC solenoid pressure, ATF flow to the torque converter charge circuit and cooler circuits can be shut down by the Main Regulator Valve resulting in torque converter overheating.

Another contributing factor to the torque converter overheating problem is that the OEM balance circuit for the Main Regulator Valve does not provide sufficient ATF flow to properly counteract EPC solenoid pressure, which tends to keep the Main Regulator Valve in the high line position restricting ATF feed to the torque converter and cooler circuits.

There are several known prior art patents that are available in the field and their discussion follows. One example is U.S. Pat. No. 4,271,939 to Iwanga et al., which discloses a hydraulic control system for a torque converter for ensuring release of the lock-up condition of the torque converter. This is accomplished by providing a flow restrictor in the hydraulic working fluid supply passage for the torque converter to make the flow resistance of the passage equal to or larger than the flow resistance of the hydraulic working fluid supply passage for the lock-up control chamber. In this control system a first or feed passageway communicates with a source of pressurized fluid and with a torque converter chamber, a second or discharge passageway communicates with the torque converter chamber and a third passageway communicates with a lock-up control or clutch chamber of the lockup clutch. A lockup control valve communicates with the same source of pressurized fluid and with the third passageway. The first passageway is provided with the flow restrictor. With the provision of the flow restrictor, the disengagement of the lockup clutch will be assured upon pressurization of the third passageway.

Another example is U.S. Pat. No. 4,618,036 to Ideta, which discloses a hydraulic control system for the lockup clutch of a torque converter wherein release of a lockup clutch is ensured even when the discharge flow rate of the pump is low. This control system comprises a pump driven by an engine to discharge fluid, a torque converter having a lockup clutch with a lockup clutch piston movable to a clutch released position when fluid pressure within a lockup release chamber is higher than fluid pressure within a working chamber in the torque converter cavity, a line pressure regulator valve and an orifice, which provides a restricted flow communication between the torque converter and the pump even when line pressure generated by the line pressure regulator valve is lower than a predetermined value.

The Ideta ('036) patent utilizes cutouts 20 formed on the land 32d of the first spool 32 (FIG. 1) on the line pressure regulator valve to permit a sufficient flow of hydraulic fluid via oil conduit 62 to torque converter 10 at low speed operation to ensure the release of the lockup clutch.

The present invention provides a Pressure Regulator Valve Assembly having advantages over the prior art. The present invention is a replacement Pressure Regulator Valve Assembly for maintaining a continuous flow of hydraulic fluid to the torque converter in all operating modes of an automatic transmission such as the Ford E40D and other similar transmissions to prevent torque converter overheating.

SUMMARY OF THE INVENTION

Accordingly, the present Pressure Regulator Valve Assembly includes a valve piston subassembly having an encapsulated internal check valve in fluid communication with the line pressure circuit, which diverts ATF to the torque converter charge circuit responsive to a lower fluid pressure (i.e. 2–5 psi) than is required to fill the torque converter under normal operating conditions. Thus, at high pressure conditions and during torque converter release an adequate ATF level is maintained in the torque converter to prevent overheating.

When the vehicle engine is shut off the internal check valve also prevents ATF from draining back through the Pressure Regulator Valve to the sump to maintain an adequate ATF level in the torque converter at engine startup. In addition, a Balance Boost fluid circuit has been added to the present Pressure Regulator Valve to assist the OEM Balance circuit in counteracting the electronic pressure control (EPC) solenoid pressure.

The present Pressure Regulator Valve is a direct replacement for the OEM Main Regulator Valve that is standard equipment on Ford E40D transmission, which will be referred to throughout this specification.

There has thus been outlined, rather broadly, the important features of the invention in order that the detailed description thereof that follows may be better understood, and in order that the present contribution to the art may be better appreciated.

Other features and technical advantages of the present invention will become apparent from a study of the following description and the accompanying drawings.

BRIEF DESCRIPTION OF THE DRAWINGS

The novel features of the present invention are set forth in the appended claims. The invention itself, however, as well as other features and advantages thereof will be best understood by reference to the following detailed description of an illustrative embodiment when read in conjunction with the accompanying figures, wherein:

DETAILED DESCRIPTION OF THE PREFERRED EMBODIMENTS

Figure 1:
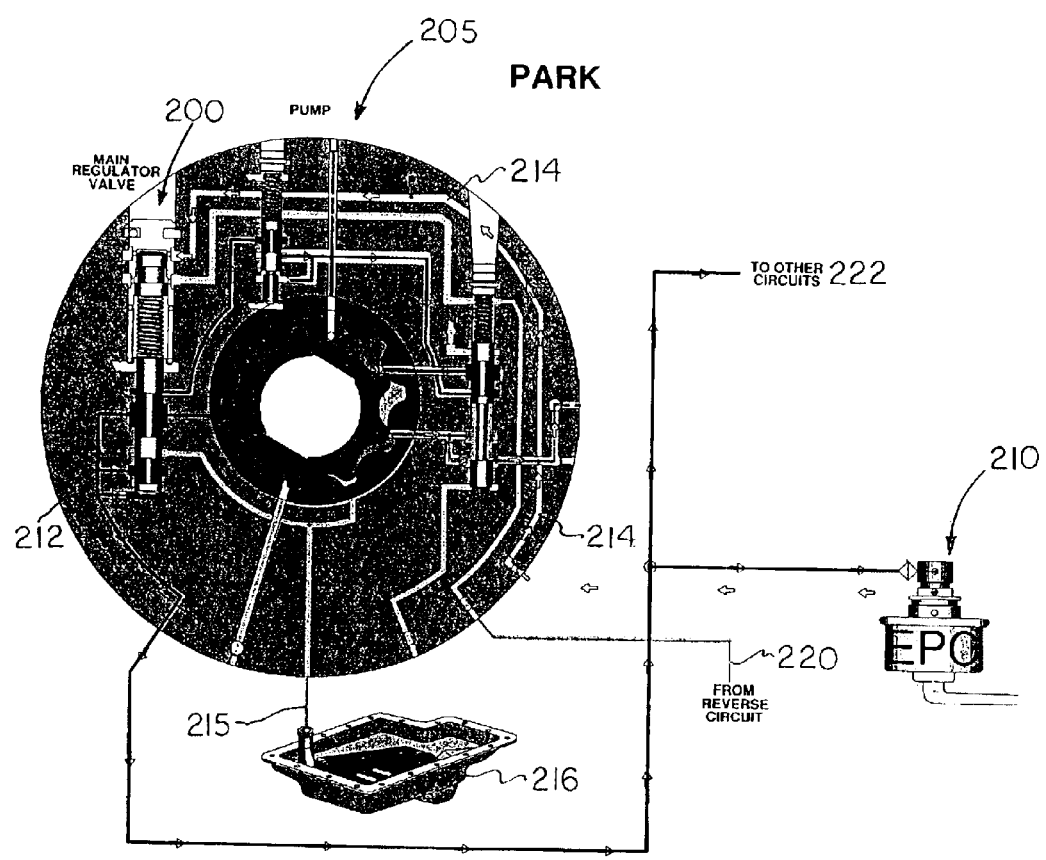
FIG. 1 is a schematic drawing of the pump body of the Ford E40D transmission showing the location of the Main Regulator Valve and labeled Prior Art.

Prior to describing the present invention in detail it may be beneficial to review the function of the Main Regulator Valve within the hydraulic system of the Ford E40D automatic transmission. Referring to FIG. 1 there is shown a schematic view of a portion of the hydraulic system of the aforementioned Ford E40D transmission wherein a Main Regulator Valve, indicated generally at 200, is illustrated in the Park gear range. The Main Regulator Valve 200 is located in the pump body, indicated generally at 205, of the transmission and regulates line pressure in relation to vehicle operating conditions.

More particularly, in the Ford E40D transmission the Powertrain Control Module (not shown) controls line pressure via the Electronic Pressure Control (EPC) solenoid, indicated generally at 210. ATF under pressure in the EPC circuit as at 214 primarily controls the position of the Main Regulator Valve 200.

The position of the Main Regulator Valve 200 is also controlled by fluid under pressure in the Reverse circuit as at 220. ATF flow within the Reverse circuit provides a boost in line pressure when the transmission operates in the Reverse gear range and in Manual $1^{st}$ gear.

The Main Regulator Valve 200 also controls the flow of ATF from the pump 205 into the suction circuit as at 215 to the sump 216. If more fluid from the pump 205 enters the suction circuit 215, pressure in the line circuit as at 212 is lower. If less fluid from the pump 205 enters the suction circuit 215, pressure in the line circuit 212 is higher. ATF in the line circuit 217 supplies the other hydraulic circuits as at 222.

Figure 2:
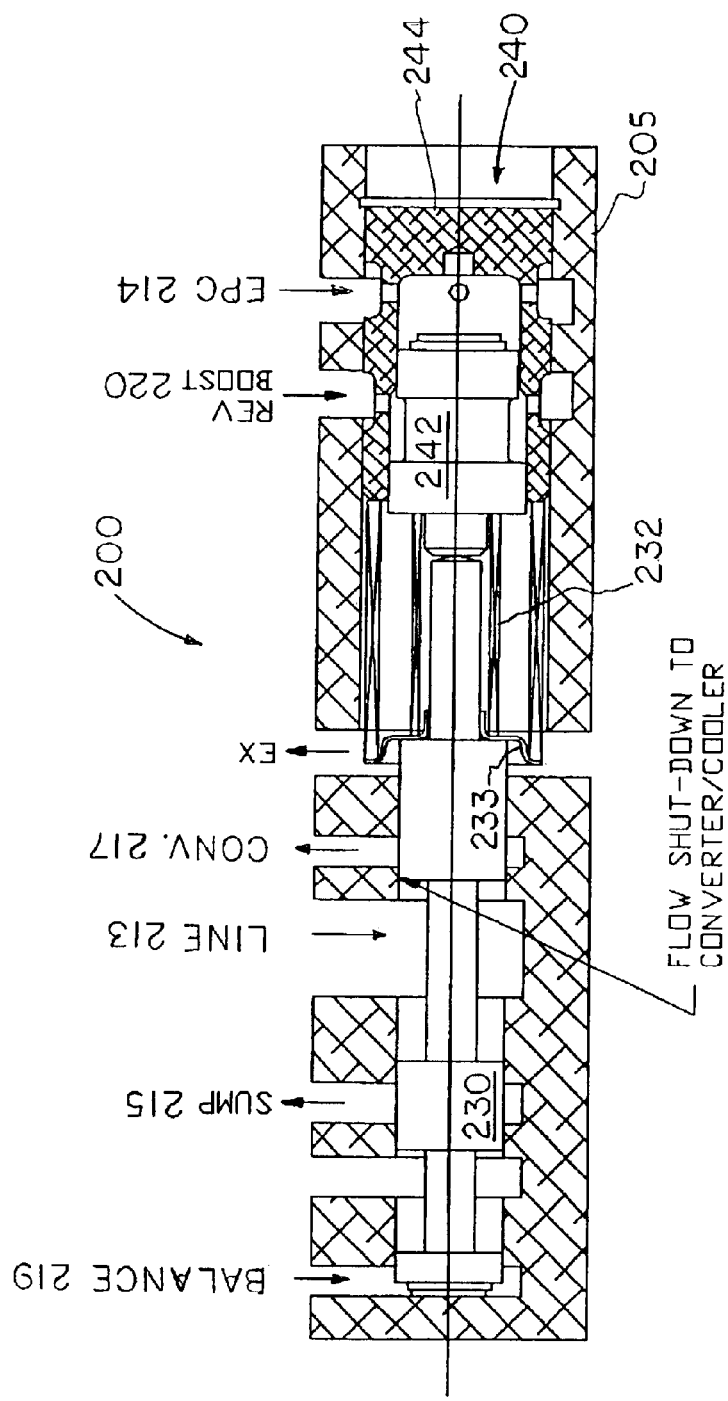
FIG. 2 is a cross-sectional view of the Ford E40D pressure regulator valve shown in an open position within the valve body and labeled Prior Art.

As shown in FIG. 2 the OEM Main Regulator Valve 200 comprises a spool type valve including an elongated cylindrical piston 230 having a plurality of concentric diameters or spools, a compression spring 232, and a spring seat 233 arranged coaxially within the pump body 205 shown in partial section. The Main Regulator Valve 200 functions in combination with the OEM Reverse Boost Valve, indicated generally at 240, which includes a valve piston 242 disposed within a valve sleeve 244.

In operation the force of the spring 232 acting on the piston 230 keeps the Main Regulator Valve 200 and Reverse Boost Valve 240 substantially closed (i.e. shifted to the right) at idle and low engine speeds. As engine speed increases, fluid pressure from the electronic pressure control (EPC) circuit 214 acts directly on the reverse boost valve 240, stroking the piston 242 against the force of spring 232 which, in turn, strokes the valve piston 230 to generate increased line pressure as illustrated in FIG. 2. It will be noted that in the OEM design ATF flow to the torque converter/cooler charge circuit 217 is blocked when the valve piston 230 is in the high line pressure position (FIG. 2).

This shut down of ATF flow to the torque converter/cooler charge circuit 217 in the high pressure position is compounded by the fact that the OEM balance circuit as at 219 delivers insufficient ATF flow to properly counteract EPC circuit 214 pressure. This results in delayed ATF feed to the torque converter/cooler circuit 217 and retention of high line pressure after a return to low demand conditions. These design characteristics combine to cause torque converter overheating problems in the Ford E40D transmission, which are well known in the transmission service industry.

Figure 3:
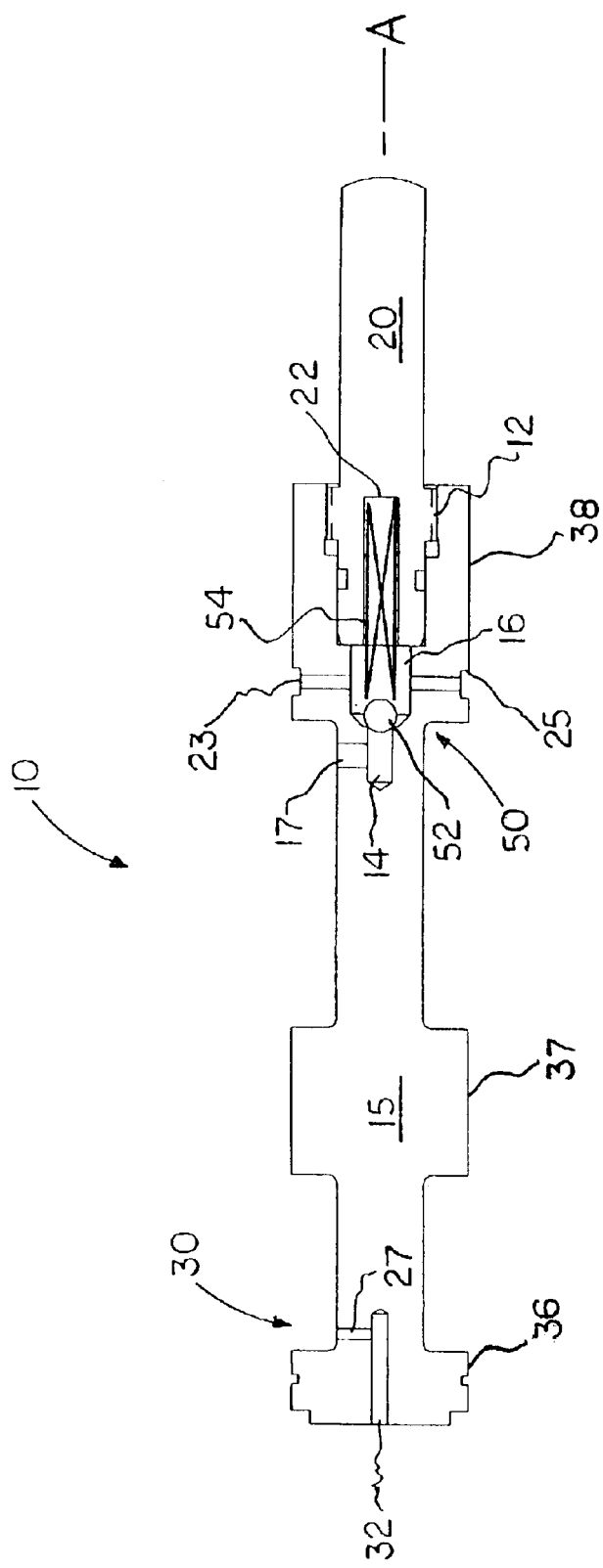
FIG. 3 is a cross-sectional view of the Pressure Regulator Valve of the present invention showing the components thereof.

Thus, the present invention has been developed to provide an improved Pressure Regulator Valve Assembly to correct these problems, which will now be described. Referring now to FIG. 3 there is shown therein an improved Pressure Regulator Valve Assembly in accordance with the present invention, indicated generally at 10, which is a direct replacement for the OEM Main Regulator Valve 200.

As shown in FIG. 3 the Pressure Regulator Valve Assembly 10 is comprised of a piston body 15 having control lands 36–38 and a snout member 20, which are mechanically attached in end-to-end relation by mating threads as at 12 encapsulating an internal check valve, indicated generally at 50. The internal check valve 50 functions to provide a continuous flow of ATF to the cooler/converter charge circuits 217 in all operating modes as explained hereinafter in further detail.

The check valve 50 is comprised of a check ball 52, which is captured within valve chamber 16 and disposed in opening/closing relation to a fluid passage 14 formed in the piston body 15. A compression spring 54 is arranged within a recess 22 formed in the snout member 20 to spring bias the check ball 52 to the closed position as shown in FIG. 3. The valve chamber 16 is in fluid communication with the line pressure circuit 213 (FIG. 4B) via fluid passage 14 and orifice 17. A plurality of ATF feed holes 23 extend radially from the valve chamber 16 and feed into groove 25, which is in fluid communication with the torque converter/cooler circuit 217 (FIGS. 4A and 4B).

The present Pressure Regulator Valve Assembly 10 also provides structures comprising fluid balancing means including, but not limited to, the following structures. The piston body 15 includes an internal Balance Boost circuit, indicated generally at 30, as shown in FIG. 3, which is comprised of a fluid passage 32 of a predetermined diameter formed along the longitudinal axis -A- at the distal end (i.e. left end in FIG. 3) of the piston body 15 in fluid communication with the preexisting balance circuit 219 (FIG. 4A).

The passage 32 is also positioned in fluid communication with regulated line pressure as at 221 via orifice 27. Thus, the present Balance Boost circuit 30 provides for the ingress of Regulated Line Pressure, which acts in conjunction with the fluid pressure in the preexisting Balance circuit 219 to counterbalance EPC circuit pressure 214 facilitating the return stroke of the Pressure Regulator Valve 10 to the low pressure position as hereinafter explained.

Figure 4A:
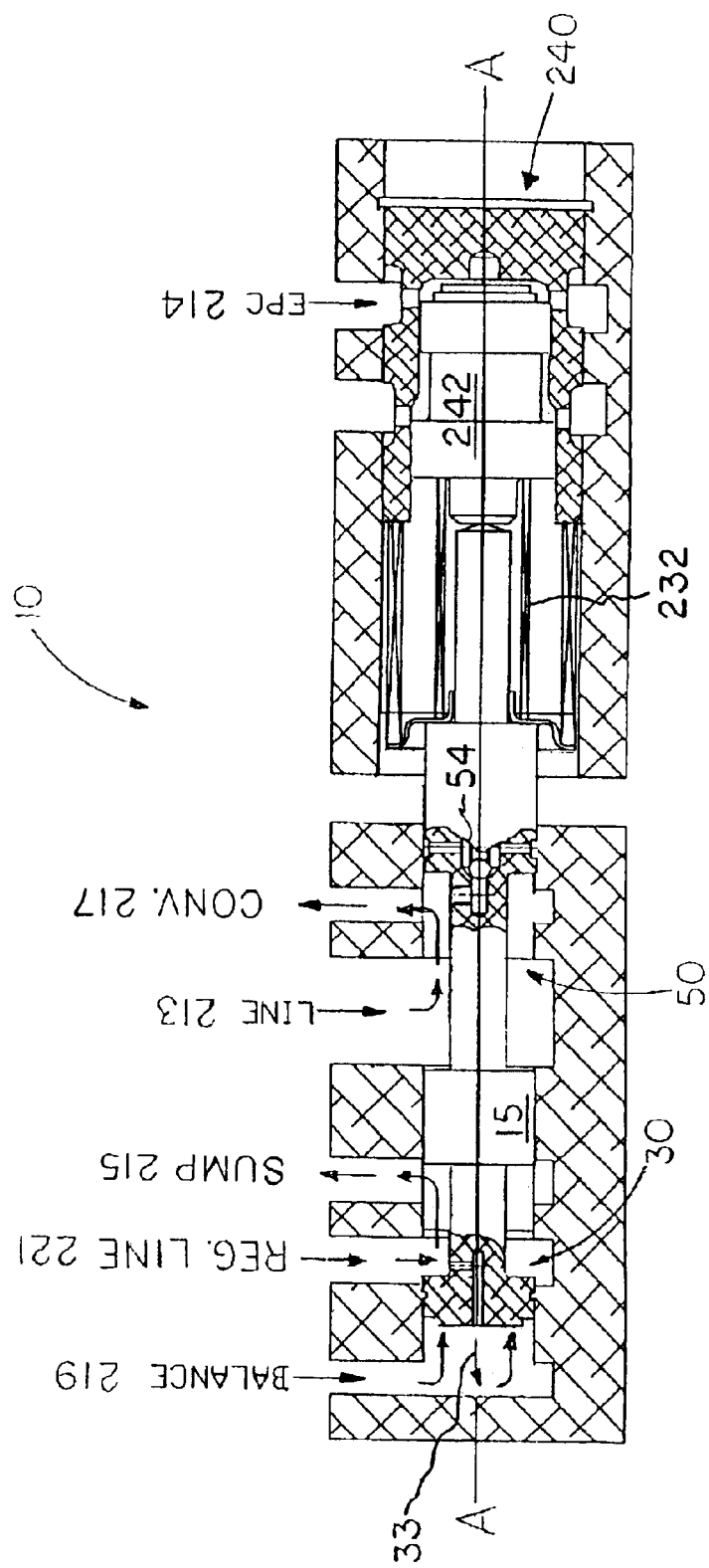
FIG. 4A is a cross-sectional view of the present Pressure Regulator Valve shown in the low line pressure position within the valve body.
Figure 4B:
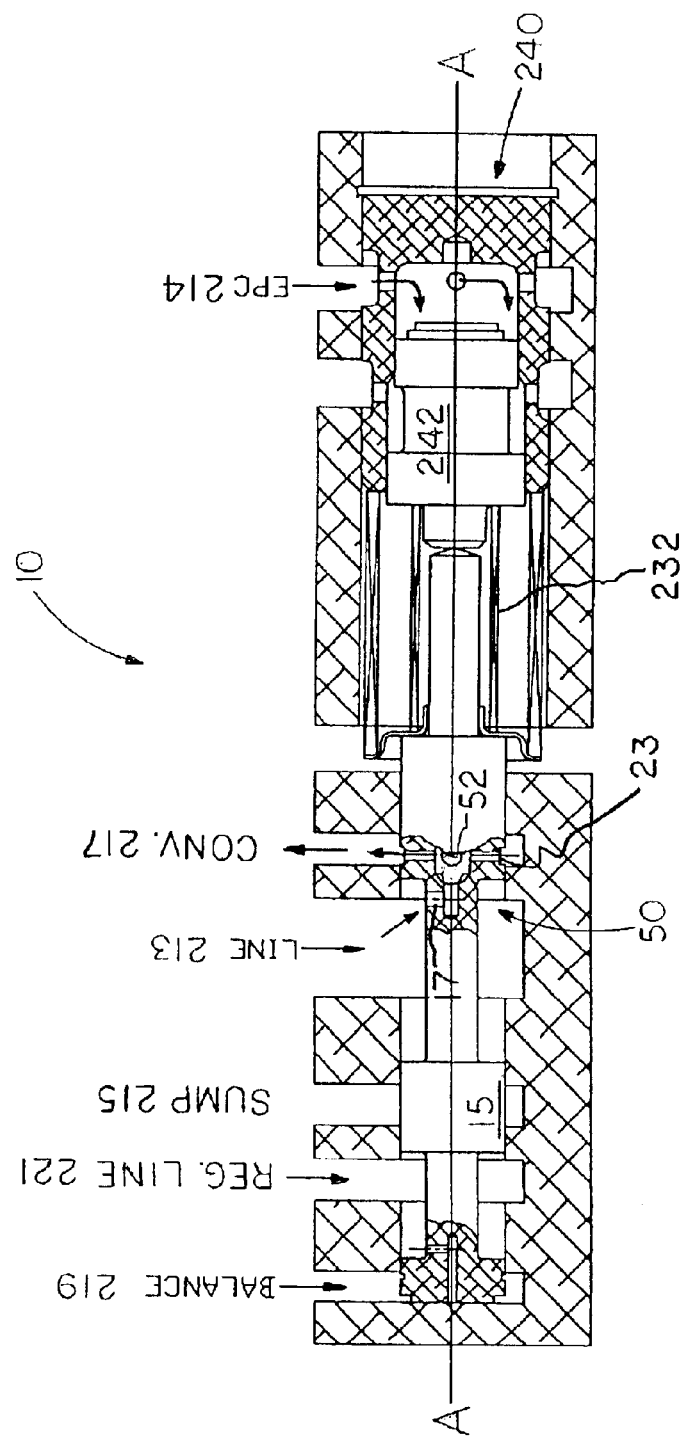
FIG. 4B is a cross-sectional view of the present Pressure Regulator Valve shown in the high line pressure position.

Still referring to FIG. 4A the present Pressure Regulator Valve 10 is shown installed in the valve body 205 in direct replacement of the OEM Main Regulator Valve 200. FIG. 4A represents the Pressure Regulator Valve 10 at the low pressure position (i.e. low EPC solenoid fluid pressure). It will be noted that in this low demand position regulated line pressure as at 221 enters the Balance Boost circuit 30 (shown by directional arrows 33) to assist the OEM Balance circuit as at 219 in the return stroke of the valve piston. In this position the port to the torque converter/cooler circuit 217 and connecting lubrication circuit 222 (FIG. 1) is open to permit ATF flow therein. Thus, the check ball 52 is held in the closed position by spring 54 as shown in FIG. 4A.

FIG. 4B represents the Pressure Regulator Valve 10 at high engine speed and high EPC solenoid fluid pressure. It will be seen that in this high demand position EPC fluid pressure 214 strokes the Reverse Boost Valve 240 against the pressure of spring 232 which, in turn, strokes the piston body 15 closing the torque converter/cooler circuit 217 and the sump circuit 215.

In the present Pressure Regulator Valve Assembly 10 increased fluid pressure within line circuit 213 enters the orifice 17 and the check ball 52 is unseated against the pressure of spring 54 (FIG. 3) to permit the flow of ATF via feed holes 23 into the torque converter/cooler circuit 217. The spring 54 is calibrated to allow the check ball 52 to open in the range of 2 to 5 pounds per square inch (psi) and to permit full flow at 10 psi. In this manner a continuous flow of ATF is provided to the torque converter/cooler circuit 217 in all operating modes of the Ford E40D transmission and the torque converter overheating problem is substantially eliminated.

When the engine is turned off the present Pressure Regulator Valve Assembly 10 returns to the position shown in FIG. 4A and the internal check ball 52 is spring-biased to the closed position by spring 54, which prevents ATF within the converter/cooler charge circuit as at 217 from draining back through the present Valve Assembly 10 to the sump.

Thus, it can be seen that the present Pressure Regulator Valve Assembly 10 is a direct replacement for the OEM Ford E40D Main Regulator Valve 200, which includes an internal check valve 50 that provides increased ATF flow into the cooler/converter charge circuit 217 during high pressure operating modes. After sufficient line pressure is built up, the internal check valve 50 is opened and line pressure is diverted to the torque converter/cooler circuit 217. When the engine is shut off the present internal check valve 50 closes to prevents ATF from draining back through the present Valve Assembly 10 substantially reducing converter drain back.

The present Pressure Regulator Valve Assembly 10 also provides an internal Balance Boost circuit 30 within the piston body 15, which diverts regulated line pressure to the preexisting Balance circuit 219 to assist in shifting the valve instantaneously from the high pressure position (FIG. 4B) to the low pressure position (FIG. 4A).

Although not specifically illustrated in the drawings, it should be understood that additional equipment and structural components will be provided as necessary and that all of the components described above are arranged and supported in an appropriate fashion to form a complete and operative Pressure Regulator Valve Assembly incorporating features of the present invention.

Moreover, although illustrative embodiments of the invention have been described, a latitude of modification, change, and substitution is intended in the foregoing disclosure, and in certain instances some features of the invention will be employed without a corresponding use of other features. Accordingly, it is appropriate that the appended claims be construed broadly and in a manner consistent with the scope of invention.

What is claimed is:

1. A pressure regulator valve assembly for maintaining a continuous flow of hydraulic fluid to the torque converter during high speed operation of an automotive transmission, said pressure regulator valve comprising:

a valve piston subassembly for regulating the flow of hydraulic pressure to fluid circuits within a valve body of the transmission including the line pressure circuit and the torque converter charge circuit, wherein said valve piston subassembly further comprises a piston body coupled by mating threads to a detachable snout member, said piston body and said snout member defining a valve chamber therebetween; and an internal check valve encapsulated within said valve chamber in fluid communication with the line pressure circuit and the torque converter charge circuit, wherein hydraulic fluid is diverted from the line pressure circuit to the torque converter charge circuit via said internal check valve responsive to a predetermined hydraulic pressure.

2. The pressure regulator valve assembly of claim 1 wherein said predetermined hydraulic pressure is in the range of 2 to 10 psi.

3. The pressure regulator valve assembly of claim 1 wherein said internal check valve is comprised of a check ball captured within said valve chamber, wherein said check ball is disposed in closing relation to a fluid passage formed in said piston body, wherein said fluid passage interconnects the line pressure circuit and the torque converter charge circuit, said check ball being biased to a closed position by a compression spring disposed within the valve chamber.

4. The pressure regulator valve assembly of claim 1 including an internal balance boost circuit formed within said piston body, wherein said balance boost circuit interconnects the regulated line pressure circuit and the balance circuit within the valve body, said internal balance boost circuit functioning to divert regulated line pressure to the balance circuit for rapidly shifting said valve piston subassembly from a high pressure position to a low pressure position.

5. A replacement pressure regulator valve assembly for an automatic transmission for maintaining a continuous flow of hydraulic fluid to the torque converter during high speed operation of the transmission to prevent torque converter overheating, said replacement pressure regulator valve comprising:

a valve piston subassembly for regulating hydraulic pressure to fluid circuits within the valve body of the transmission including the line pressure circuit and the torque converter charge circuit;

an internal check valve encapsulated within said valve piston subassembly in fluid communication with the line pressure circuit and the torque converter charge circuit such that hydraulic fluid is diverted, to the torque converter through said internal check valve responsive to a predetermined hydraulic fluid pressure; and an internal balance boost circuit formed within said valve piston subassembly wherein said internal balance boost circuit interconnects a regulated line pressure circuit and a balance circuit to divert regulated line pressure to the balance circuit to assist in shifting said valve piston subassembly from a high pressure position to a low pressure position.

6. The pressure regulator valve assembly of claim 5 wherein said valve piston subassembly further comprises a piston body mechanically attached by mating threads in coaxial relation to a detachable snout member, said piston body and said snout member defining a valve chamber wherein said internal check valve is permanently captured.

7. The pressure regulator valve assembly of claim 6 wherein said internal check valve is comprised of a check ball disposed within said valve chamber in closing relation to a fluid passage formed in said valve piston, wherein said fluid passage interconnects the line pressure circuit and the torque converter charge circuit, said check ball being biased to a closed position by a compression spring positioned against said check ball.

8. The pressure regulator valve assembly of claim 5 wherein said predetermined hydraulic pressure is in the range of 2 to 10 psi.

9. A method of maintaining a continuous flow of hydraulic fluid to the torque converter of an automatic transmission having a valve body including a plurality of fluid circuits formed therein, said method comprising the steps of:

providing a replacement pressure regulator valve assembly for installation within the valve body in fluid communication with a line pressure circuit and a torque converter charge circuit;

diverting hydraulic fluid from the line pressure circuit to the torque converter charge circuit through said pressure regulator valve assembly when said pressure regulator valve assembly is in a high pressure position;

passing hydraulic fluid from a regulated line pressure circuit to a balance circuit within the valve body to shift said pressure regulator valve assembly to a low pressure position;

blocking the return flow of hydraulic fluid from the torque converter charge circuit through said fluid passage when the transmission is not operating.

10. The method of claim 9 wherein the step of providing further includes the steps of:

fabricating a valve piston having an internal balance boost circuit formed therein for interconnecting the line pressure circuit and the torque converter charge circuit;

attaching a snout member in coaxial relation to said valve piston; and encapsulating an internal check valve intermediate said valve piston and said snout member.

11. The method of claim 10 wherein the step of encapsulating further includes the steps of:

inserting a check ball within said valve piston adjacent said internal balance boost circuit;

positioning a compression spring within said snout member; and joining said snout member to said valve piston thereby biasing said check ball to a closed position in relation to said internal balance boost circuit.

12. The method of claim 11 wherein the step of joining is carried out by engagement of mating internal and external threads formed on said valve piston and said snout member respectively.

13. The method of claim 9 wherein the step of diverting is carried out by an internal check valve disposed in opening/closing relation to said fluid passage.

14. The method of claim 13 wherein the step of blocking is carried out by said internal check valve.

15. The method of claim 9 wherein the step of passing is carried out by an internal balance boost circuit formed within said pressure regulator valve assembly, wherein said internal balance boost circuit interconnects said regulated line pressure circuit and said balance circuit.

\* \* \* \* \*